United States Patent
Koenzen

[11] Patent Number: 5,631,925
[45] Date of Patent: May 20, 1997

[54] BIT RATE DETECTION

[75] Inventor: Ralf Koenzen, Herzogenrath, Germany

[73] Assignee: Elsa GmbH, Aachen, Germany

[21] Appl. No.: 513,937

[22] PCT Filed: Mar. 8, 1994

[86] PCT No.: PCT/DE94/00237

§ 371 Date: Oct. 27, 1995

§ 102(e) Date: Oct. 27, 1995

[87] PCT Pub. No.: WO94/22252

PCT Pub. Date: Sep. 29, 1994

[30] Foreign Application Priority Data

Mar. 17, 1993 [DE] Germany .......................... 43 08 418.4

[51] Int. Cl.$^6$ .................................................. H04B 3/46
[52] U.S. Cl. .................................................. 375/225
[58] Field of Search .................................. 375/225, 377;
370/84; 364/514; 371/5.5

[56] References Cited

U.S. PATENT DOCUMENTS 5,072,407 12/1991 Gutz et al. ................. 364/514
5,206,888 4/1993 Hiraguchi et al. .............. 377/20

FOREIGN PATENT DOCUMENTS

| 57-103546 | 6/1982 | Japan . |
| 60-025351 | 2/1985 | Japan . |
| 2016846 | 1/1990 | Japan . |
| 2234531 | 9/1990 | Japan . |
| 4035537 | 2/1992 | Japan . |

*Primary Examiner*—Stephen Chin
*Assistant Examiner*—Kevin Kim
*Attorney, Agent, or Firm*—Felfe & Lynch

[57] ABSTRACT

A serial data stream of control commands is sent to a shift register having a delay time corresponding to a shift frequency which is a multiple of the maximum expected bit rate, each control command beginning with a uniform binary character having a start sequence with a maximum duration. The bit rate is calculated from the duration of the start sequence which is measured by activating a counting circuit during the time in which the data stream is passing through the shift register. The bit rate is programmed into an integrated serial data transmission component, preferably a UART, and the delay time of the shift register is determined according to the maximum duration of the start sequence, plus the time required to program the bit rate into the UART.

4 Claims, 2 Drawing Sheets

BIT RATE DETECTION

BACKGROUND OF THE INVENTION

The invention pertains to a process for detecting the bit rates, in particular high bit rates, of serial data streams of data terminals, the control commands of the stream beginning with uniform binary characters.

The data transmission devices according to the state of the art such as modems with the standardized AT command set, which is a standard command language for communicating with data transmission devices, usually make it possible for data to be transmitted to and from the data terminal at various transmission speeds.

Problems occur when the data transmission device must be able to detect the transmission rate used by the data terminal so that it can adjust itself to that rate. Detection is possible in principle because all the control commands from the data terminal to the data transmission device begin with uniform binary characters such as, for example, the ASCII symbol "A" (=binary 01000001) or "a" (=binary 01100001).

In a known process for detecting the bit rate, the received data stream is sampled at a multiple of the maximum bit rate to be expected and compared in software with various bit patterns. Once the bit pattern has been determined, it is then possible to make a conclusion concerning the bit rate and the binary characters received ("A" or "a"). In the known process, the entire command line must be evaluated, that is, processed in software bit for bit.

This process suffers from the disadvantages that it can be realized only for low bit rates and only with the simultaneous help of a significant amount of the processing power of the CPU present in the data transmission device. Under favorable conditions, therefore, it is possible to deal with bit rates of only up to 57,600 bits/second.

SUMMARY OF THE INVENTION

The invention is based on the task of creating a process by means of which high bit rates can be reliably detected without the imposition of excessive demands on the CPU of the data transmission device. The invention is also based on the task of providing a device for implementing the process.

The accomplishment of the task indicated is based on the idea of using hardware to solve the problem instead of software. The invention is also based on the idea that the start bit or the first bits with the value "0" (start sequence) are framed by two "1" bits, so that, by determining the duration of this start sequence, it is possible to derive the bit rate used by the data terminal.

The details of the way in which the task is accomplished are as follows:

the serial data stream is sent to a digital delay stage;

during the time in which the data stream is passing through the delay stage designed as a shift register which is timed at a multiple of the maximum expected bit rate (shift frequency), the duration of the first bits with the value "0" (start sequence) is measured by activation of a counting circuit; and the bit rate calculated from this measurement is programmed into an integrated component for serial data transmission.

The delay time is equal at least to the maximum duration of the start sequence plus the length of time it takes for the CPU to program the integrated component for serial data transmission. The storage capacity of the shift register required for this purpose is at least equal to the product of the shift frequency and the maximum length of the start sequence plus the time required for programming.

The digital delay stage makes it possible for the integrated component for serial data transmission, preferably a UART (Universal Asynchronous Receiver/Transmitter) of the type normally used in microprocessor technology, to be adjusted to the expected bit rate before the data stream arrives; during the time in which the data stream passes through the delay stage, the duration of the first bit or of the first bits with the value "0" is measured, and from this measurement result, the bit rate is determined in the CPU of the data transmission device and programmed into the integrated component for serial data transmission.

The start sequence is measured by activation of a counting circuit, and the bit rate calculated from the counter status is programmed into the integrated component for serial data transmission.

Because the bit rate must be adjusted in the integrated component for serial data transmission before the start bit of the first character to be received arrives there, the delay time is selected so that it is equal at least to the maximum duration of the start bit or of the start sequence plus the length of time required to program the integrated component for serial data transmission. The command line can then be received without problems.

By the use of the process described above, it is also possible to realize a hardware solution to the bit rate detection problem. That is, it is now possible to design a device which solves the problem that the UART must be adjusted to the expected bit rate before the data stream arrives, namely, to a bit rate which is not yet known.

Apparatus for implementing the process described is provided with a digital delay stage connected in front of an integrated component for serial data transmission;

a counting circuit;

a computer unit (CPU) connected to the counting circuit and to the integrated component for serial data transmission; and a timer for the counting circuit and the delay stage. So that the signal form of the serial signal is not distorted too severely by the delay, the delay stage is preferably designed as a digital shift register, which is timed at a multiple of the maximum bit rate to be expected (shift frequency). The shift frequency is preferably greater than or equal to 8 times the expected bit rate.

In an advantageous embodiment of the invention, the counting circuit consists of a gate controller, which is connected to the CPU by a reset line, and a counter. The gate controller also has an interrupt line to the CPU, and a line for the timing of the counter leads from the gate controller by way of the counter to the CPU.

The invention is explained in greater detail below on the basis of an exemplary embodiment:

DETAILED DESCRIPTION OF THE PREFERRED EMBODIMENT

Figure 1:
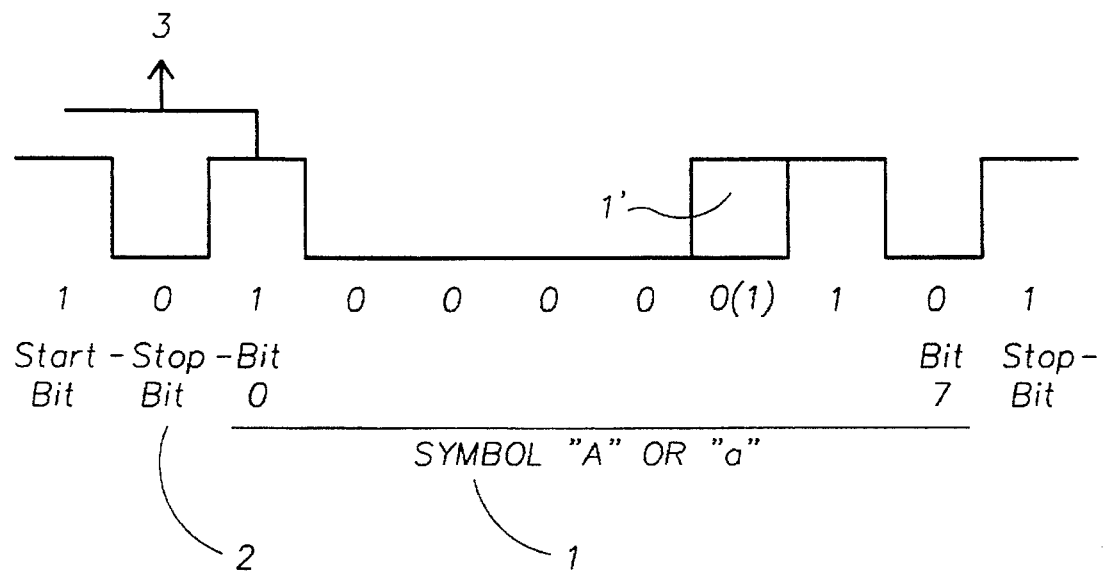
FIG. 1 shows the sequence of signals on the data line to the data transmission device.

The control commands from the data terminal to the data transmission device begin with the ASCII character "A"

(=binary 01000001) or "a" (=binary 01100001). These binary characters "A" and "a" are designated in FIG. 1 by reference numbers 1 and 1', respectively. They are transmitted from the lowest-value bit to the highest-value bit. In conjunction with start bit 2 of the asynchronous transmission, the signal sequence "1-0-1", designated as a whole by reference number 3, is sent along the data line to the data transmission device. Start bit 2 is recognizably framed by two "1" bit symbols. By determining the duration of start bit 2, it is possible to derive the bit rate used by the data terminal.

The device for detecting the bit rate includes a shift register 5 for handling the digital delay and a UART 6, which is connected to a CPU 7 of the data transmission device. In addition, the device also has a counting circuit, which consists of a gate controller 9 and a counter 10. A timer 11 provides shift register 5 with the required shift frequency and also provides gate controller 9 with the count timing. The device functions in the following way.

When CPU 7 expects a new command line, initiated as shown in FIG. 1, it resets gate controller 9 and counter 10 by way of a reset line 12. For the duration of start bit 2 on a receiving line 13 coming from the data terminal, gate controller 9 sends the timing from timer 11 to counter 10. After the end of start bit 2, that is, on the change from status "zero" to status "one", gate controller 9 signals CPU 7 by way of an interrupt line 14 leading to the CPU that the measurement of the start bit has ended. From the count status of counter 10, which is proportional to the duration of the start bit, CPU 7 can then determine the bit rate in bits/second and program this by way of a program line 15 into UART 6.

Because the delay time is selected in correspondence with the maximum duration of start bit 2 and the length of time required to program UART 6, the signals received via line 13 do not arrive at UART 6 until after this has been adjusted to the bit rate calculated by CPU 7.

Gate controller 9 remains blocked until it is set back by way of reset line 12.

If it is assumed by way of example that the bit rates to be detected vary between 300 bits/second and 230,400 bits/second, we then find that:

(a) the maximum length of start bit 2 will be:

$$1/300 \text{ bit/sec} = 3.3 \text{ msec.}$$

The shift register 5 must delay the data stream by this time plus the reaction time of the CPU 7; and (b) the shift frequency, when it is 8 times the maximum expected bit rate, will be:

$$230,400 \text{ bits/sec} \times 8 = 1.8432 \text{ MHz.}$$

For a calculated delay of 3.3 msec and at a frequency of 1.8432 MHz, the storage capacity of the shift register 5 is calculated as follows:

1.8432 MHz×3.3 msec=6.1444 steps plus the time required to program UART 6.

Because the delay time of a memory such as this is in the microsecond range, the overall delay in the processing of the data stream does not represent any source of difficulty.

Figure 2:
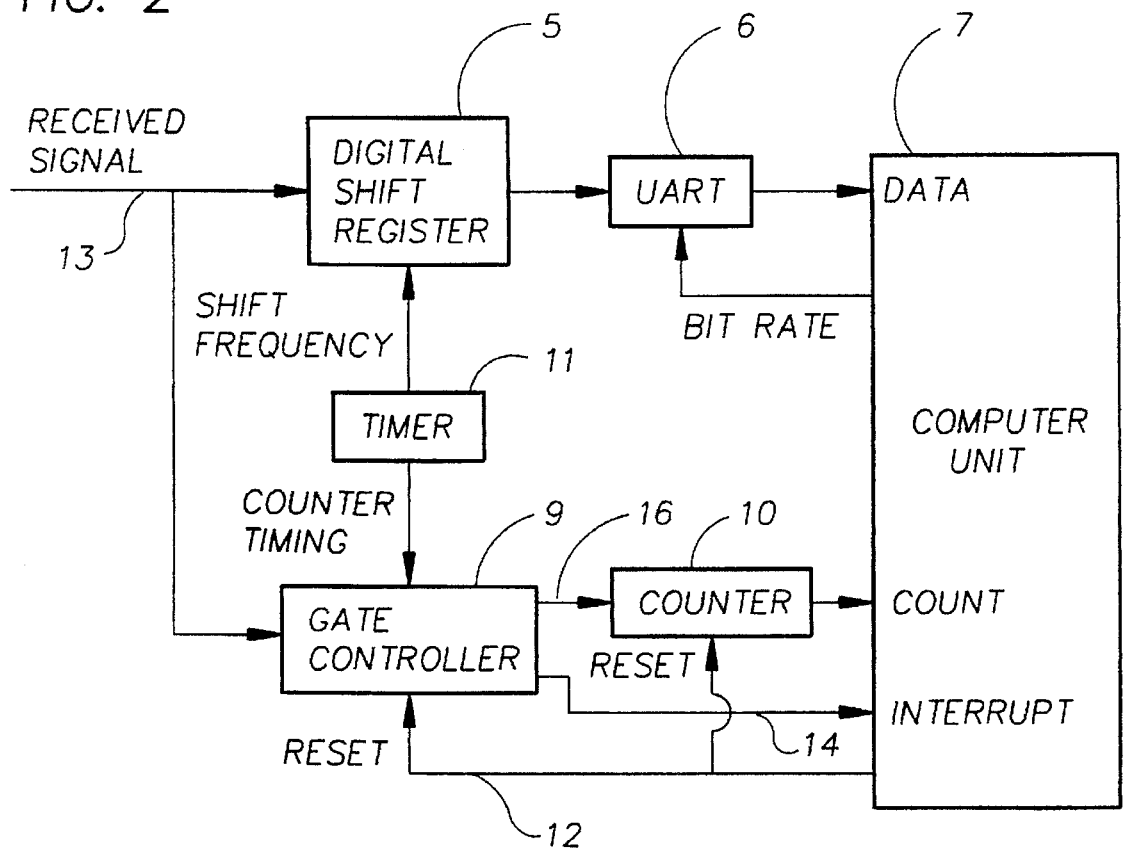
FIG. 2 shows a block circuit diagram of a device for implementing the process according to the invention.

Without departing from the basic idea of the invention, it is possible to combine one or more of the components shown in FIG. 2 into an integrated component.

Figure 3:
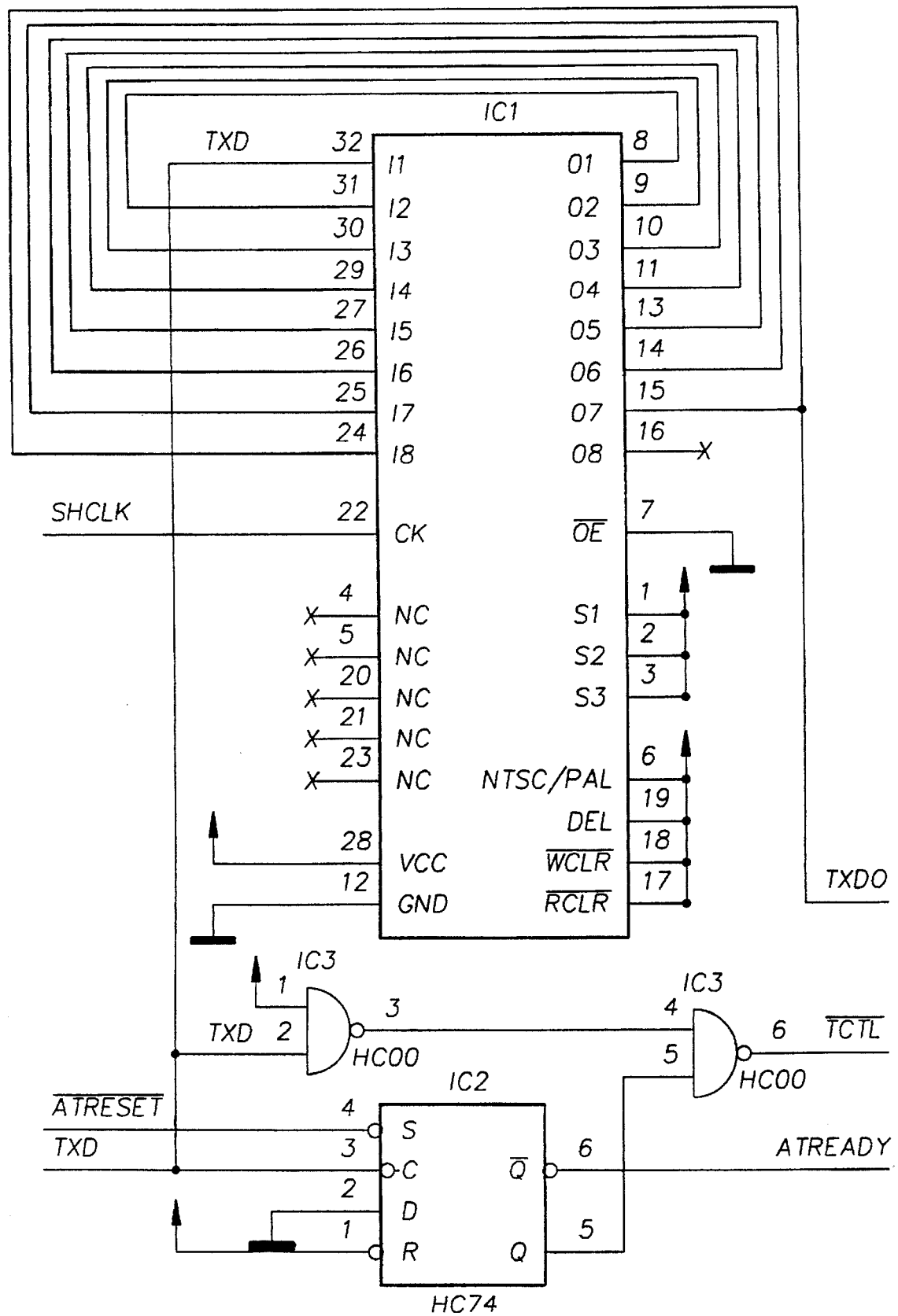
FIG. 3 shows a circuit diagram of a possible implementation of the bit rate detection process.

FIG. 3 shows a possible implementation of the bit rate detection process. The central components of the circuit are shift register IC1, which takes care of the digital delay, and the gate controller, consisting of parts IC2 and IC3. The counter, which also forms part of the overall circuit, and the standard UART (see 10 and 6 in FIG. 2) are integrated directly into the CPU (see 7 in FIG. 2) and therefore are not shown in the circuit diagram. The UART is connected to the TXDD line shown in FIG. 3, whereas the counter is started and stopped by way of the signal TCTL generated by the gate controller (IC2, IC3).

In detail, the circuit functions in the following way:

The serial signal being received (see 13 in FIG. 2) is received on line TXD and then sent to the 8-bit shift register IC1 (1,136 steps N 8 bits). Because the signal which must be delayed is only 1 bit wide, the signal is fed back at the output of the shift register to another input (see 0 and I on IC1) to increase the overall pass-through time by a factor of 7. Shift register IC1 is timed by means of the signal SHCLK at 1.8432 MHz, as a result of which the input signal is delayed by 4.32 msec. This delay time is sufficient, even for a start bit of 300 bits/sec (=3.3 msec) plus the interrupt reaction time, to allow for the programming of the UART. The delayed reception signal is then available on connecting line TXDD of the UART.

The gate controller, consisting of parts IC2 and IC3, is used to measure the start sequence. Before each measurement operation, the gate controller is reset by a zero pulse at the input ATRESET. As a result, the signal ATREADY is deactivated. As soon as the input signal has a level of 0, the counter control signal TCTL becomes active to release the counter by way of a counter control signal line (see 16 in FIG. 2). As soon as the input signal TXD returns to a level of 1, the counter control signal TCTL is deactivated again, whereas the flip-flop, implemented in IC2, flips over and thus generates a signal at the output ATREADY of the CPU that the measurement operation has been completed. This signal triggers an interrupt, which causes the CPU (not shown in FIG. 3; see 7 in FIG. 2) to determine the status of the counter and to program the associated bit rate into the UART (not shown in FIG. 3; see 6 in FIG. 2).

Flip-flop IC2 of the gate controller, which has now been flipped over, also prevents subsequent 0 bits from releasing the counter again.

I claim:

1. Process for detecting the bit rates of serial data streams of data terminals, said process comprising sending a serial data stream of control commands beginning with a uniform binary character to a shift register having a delay time corresponding to a shift frequency which is a multiple of the maximum expected bit rate, each control command beginning with a uniform binary character having a start sequence with a maximum duration;

measuring the duration of the start sequence by activation of a counting circuit during the time in which the data stream is passing through the shift register;

calculating the bit rate from said duration measured by said counting circuit;

programming the bit rate into an integrated component for serial data transmission; said integrated component being a UART;

determining the delay time of the shift register according to the maximum duration of the start sequence plus the length of time required to program the bit rate into the integrated component for serial data transmission; and providing a storage capacity of the shift register which is at least equal to the product of the shift frequency and the maximum duration of the start sequence plus the length of time required to program the bit rate into the integrated component.

2. Apparatus for detecting the bit rates, including in particular high bit rates, of serial data streams of data terminals, the control commands of the streams beginning with uniform binary characters, each uniform binary character having a start sequence, said apparatus comprising a digital shift register (5) which is times at a multiple of the maximum expected bit rate (shift frequency), to which the serial data stream is sent;

an integrated component (6) for serial data transmission connected to the shift register (5) to receive data transmitted therefrom;

a counting circuit comprising a gate controller (9) and a counter (10), which, during the time in which the data stream is passing through the shift register, measures the duration of the start sequence by activation of the counting circuit;

a computer unit (7) connected to the counting circuit and to the integrated component (6) to receive data transmitted therefrom, the gate controller being connected to the computer unit (7) by an interrupt line (14) and to the computer unit (7) by a line (16) via the counter (10), said computer serving to calculate the bit rate from the duration measured by the counter (10), to program this bit rate into the integrated component over a program line (15), and to reset the gate controller (9) and the counter (10) over a reset line (12) when the computer unit (7) receives a new control command; and a timer (11) for the counting circuit and the shift register (5), this timer serving to provide the shift register (5) with the required shift frequency and the gate controller (9) with the count timing.

3. Device according to claim 2 wherein the shift frequency is greater than or equal to eight times the expected bit rate.

4. Device according to claim 2 wherein the component for serial data transmission (6) is embodied as a UART.

* * * * *